(12) United States Patent
Takahashi

(10) Patent No.: US 8,051,047 B2
(45) Date of Patent: Nov. 1, 2011

(54) DOCUMENT MANAGEMENT SYSTEM, DOCUMENT MANAGEMENT METHOD, AND SEARCH APPARATUS

(75) Inventor: Takeshi Takahashi, Yokohama (JP)

(73) Assignee: Canon Kabushiki Kaisha (JP)

( * ) Notice: Subject to any disclaimer, the term of this patent is extended or adjusted under 35 U.S.C. 154(b) by 364 days.

(21) Appl. No.: 12/365,614

(22) Filed: Feb. 4, 2009

(65) Prior Publication Data

US 2009/0204586 A1 Aug. 13, 2009

(30) Foreign Application Priority Data

Feb. 7, 2008 (JP) .................................. 2008-028120

(51) Int. Cl.
*G06F 7/00* (2006.01)
(52) U.S. Cl. ...................................................... 707/687
(58) Field of Classification Search .................. 707/687
See application file for complete search history.

(56) References Cited

U.S. PATENT DOCUMENTS 5,983,241 A  11/1999 Hoshino
2005/0216530 A1 * 9/2005 Meller et al. .................. 707/203

FOREIGN PATENT DOCUMENTS

JP  9-34763 A  2/1997

* cited by examiner

*Primary Examiner* — Etienne Leroux
*Assistant Examiner* — Ajith Jacob
(74) *Attorney, Agent, or Firm* — Rossi, Kimms & McDowell LLP

(57) ABSTRACT

A document management system includes a reception unit that receives a designated document that has been designated by a user, an extraction unit configured to extract signature information from the received designated document, a search unit configured to search a database for another document having signature information that matches the signature information extracted by the extraction unit, the another document being a different version of the designated document, and a display control unit configured to, based on a result of the search, perform control to display document information of the designated document and document information of the another document in association with version information determined based on the signature information.

9 Claims, 16 Drawing Sheets

(DOCUMENT CREATION)

[STATE 1]

(APPROVAL = SIGNATURE)

Version 1 disclosure  ⇐ [STATE 2]

(EDIT)

[STATE 3]

(APPROVAL = SIGNATURE)

Version 2 disclosure  ⇐ [STATE 4]

⋮

DOCUMENT MANAGEMENT SYSTEM, DOCUMENT MANAGEMENT METHOD, AND SEARCH APPARATUS

BACKGROUND OF THE INVENTION

1. Field of the Invention

The present invention relates to a document management system that manages documents, method and search apparatus.

2. Description of the Related Art

As an example of conventional technology for searching for versions of a document, Japanese Patent Laid-Open No. H09-34763 discloses a document management system that stores a document in association with the document ID of an immediately previous and an immediately subsequent version of the stored document. Such a document management system enables acquiring a specified version of a certain document by successively tracing through the document IDs of the immediately previous and immediately subsequent versions of the document that are associated with the certain document.

A conventional document management system manages operations such as document creation, editing, and duplication (copy), and each time a version is updated by an operation, a new document is generated and assigned a new document ID by the document management system. However, the document management system cannot detect operation execution events in cases where a document is generated, duplicated, or updated without using the functions of the document management system, such as a case in which a correction or the like is made to a document that has been emailed by a mailer or downloaded to a local environment. Accordingly, the document management system cannot generate, attach, or store a document ID to maintain the association between documents, and therefore cannot maintain the newer-older relationship between the original document and the new document. As a result, a desired version of a document cannot be retrieved.

The above situation would frequently occur in cases such as where a document management system is operating on an intranet in a general office. Examples of such cases include retrieving a document from the document management system and copying the document to a notebook PC or removable medium in order to take the document off the intranet. In such a case, even if the document is placed back into an environment connected to the intranet, the document management system cannot detect the document. In other words, the document cannot be specified by a document ID since the document was not managed in the document management system with use of a document ID. Accordingly, it is not possible to trace back to previous versions or search for related versions.

Also, if a downloaded document is saved in a server shared between departments in order to be disclosed to another department or transmitted to a member of another department by email etc., the document management system cannot detect that the document has been emailed. In other words, the document ceases to be managed in the document management system with use of a document ID and cannot be specified by a document ID, and therefore the emailed document cannot be managed in a newer/older relationship with a document in the document management system. Also, a search for related versions cannot be performed since the document management system does not store location information for transferred documents either.

In other conventional technology, there are cases in which documents having the same filename or document name are assumed to be the same file, and the version relationship between such documents is judged based on the update dates of the documents. In such cases, if a user saves a new version of a document using a different filename or document name, the new version cannot be judged to be a derivation of the original document. Furthermore, there are many cases in which attribute information such as the update date is not retained at a time of transmission or reception by email, thereby making it difficult to judge the version relationship based on attributes. A method for detecting the legitimate version relationship does not exist in such cases, and there is a risk of version relationship information being falsified.

SUMMARY OF THE INVENTION

The present invention is provides a document management system that automatically detects a newer/older relationship between documents that have the same signature and are dispersed across a network, and reveals the version relationship between the documents.

The present invention in its first aspect provides a document management system including a database having registered therein signature information of a document and document information that includes location information indicating a storage location of the document, the document information and the signature information being registered in association with each other, the document management system comprises a reception unit configured to receive a designated document that has been designated by a user, an extraction unit configured to extract signature information from the designated document received by the reception unit, a search unit configured to search the database for another document having signature information that matches the signature information extracted by the extraction unit, the another document being a different version of the designated document, and a display control unit configured to, based on a result of the search performed by the search unit, perform control to display document information of the designated document and document information of the another document in association with version information determined based on the signature information.

The present invention in its second aspect provides a document management method performed in a document management system including a database having registered therein signature information of a document and document information that includes location information indicating a storage location of the document, the document information and the signature information being registered in association with each other, the document management method comprises the steps of receiving a designated document that has been designated by a user, extracting signature information from the designated document received in the reception step, searching the database for another document having signature information that matches the signature information extracted in the extraction step, the another document being a different version of the designated document, and performing control to, based on a result of the search performed in the search step, display document information of the designated document and document information of the another document in association with version information determined based on the signature information.

The present invention in its third aspect provides a search apparatus including a database having registered therein signature information of a document and document information that includes location information indicating a storage location of the document, the document information and the signature information being registered in association with each other, the search apparatus comprises a reception unit configured to receive a designated document that has been designated by a user, an extraction unit configured to extract signature information from the designated document received by the reception unit, and a search unit configured to search the database for another document having signature information that matches the signature information extracted by the extraction unit, the another document being a different version of the designated document.

The above aspect of the present invention enables automatically detecting the newer/older relationship between versions of the same document that are dispersed across a network, and revealing the version relationship.

Further features of the present invention will become apparent from the following description of exemplary embodiments with reference to the attached drawings.

DESCRIPTION OF THE EMBODIMENT

The following describes in detail an embodiment of the present invention, with reference to the drawings. Note that the same reference numbers have been given to constituent elements that are the same, and descriptions thereof have been omitted.

Figure 1:
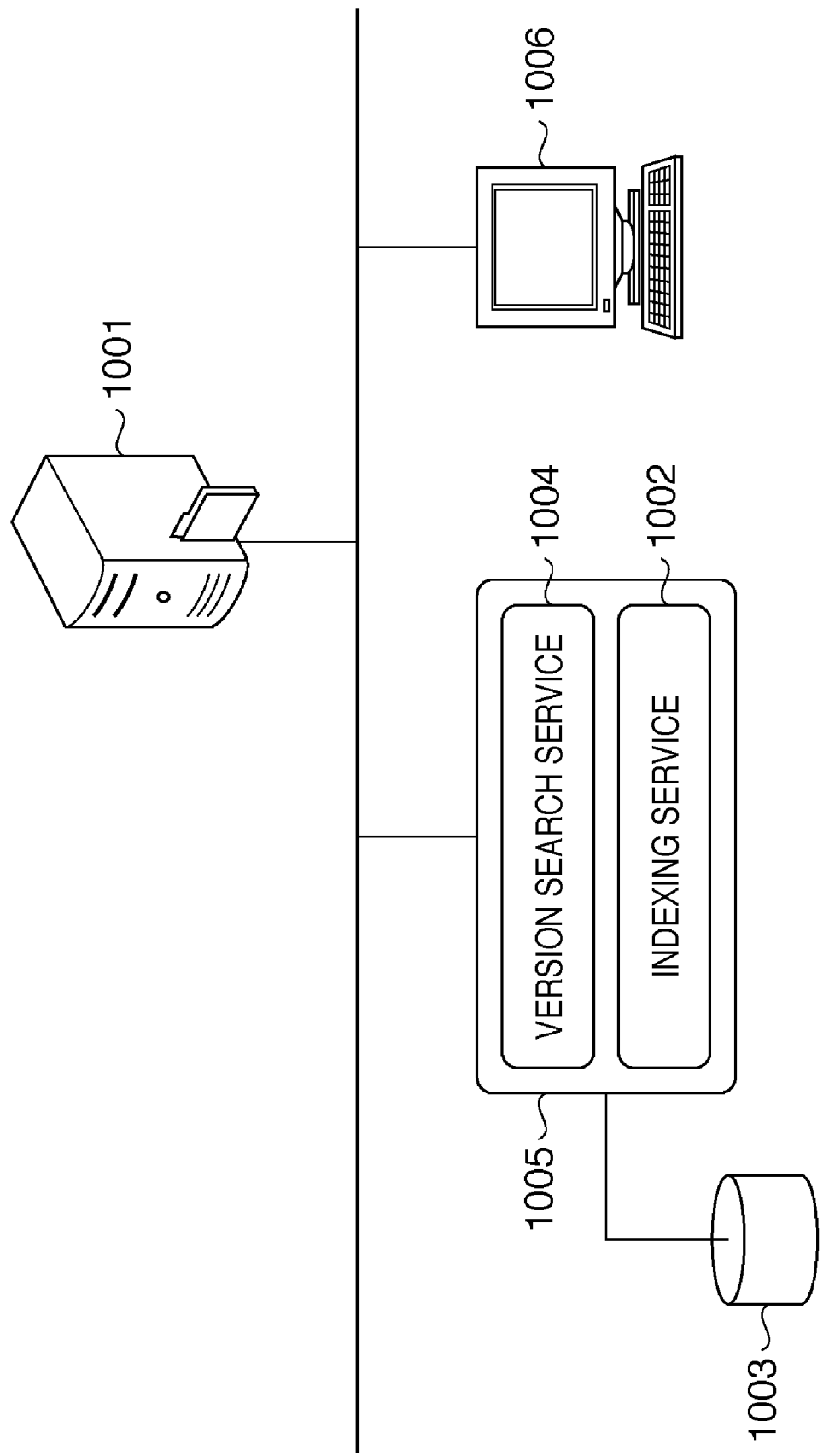
FIG. 1 shows an overall structure of a document management system including a search apparatus of an embodiment of the present invention.

FIG. 1 shows an overall structure of a document management system including a search apparatus of the present embodiment. In the present invention, a document management application for providing a user with the functions of a document management system is provided as, for example, a web service (a web application). As shown in FIG. 1, the document management system includes a storage server 1001, a search server 1005, and a client terminal 1006. The storage server 1001 stores various types of document files, and documents can be accessed from terminals on a network. The client terminal 1006 is a terminal that designates a document to be the base on which a search is to be performed. The search server 1005 includes an indexing service 1002, a version search service 1004, and a database 1003. In the present embodiment, the client terminal 1006 is also called a user terminal.

The indexing service 1002 accesses documents that are dispersed across the network, acquires location information showing the stored positions of the documents, and performs indexing by extracting data necessary for a version search from the documents or generating such data. Here, location information refers to information that can specify the location of a document. In the exemplary case of a document in a file server, the location information would be a combination of a document name and a network path that indicates a file server name and a shared folder where the document is stored. In the case of a document in a database, the location information would be a combination of a database server name that can be uniquely recognized on the network, a database instance name, a table name in the database, and a primary key. The database 1003 stores indexing data and the location information of documents.

The version search service 1004 extracts and generates search information from a document that is a search target, judges a result of the search, and transmits a result of the judgment to the database 1003. In the present embodiment, the above services and database are not necessarily consolidated on a single server. Instead, the processing load may be distributed by constituting the above services and database on a plurality of servers.

Figure 2:
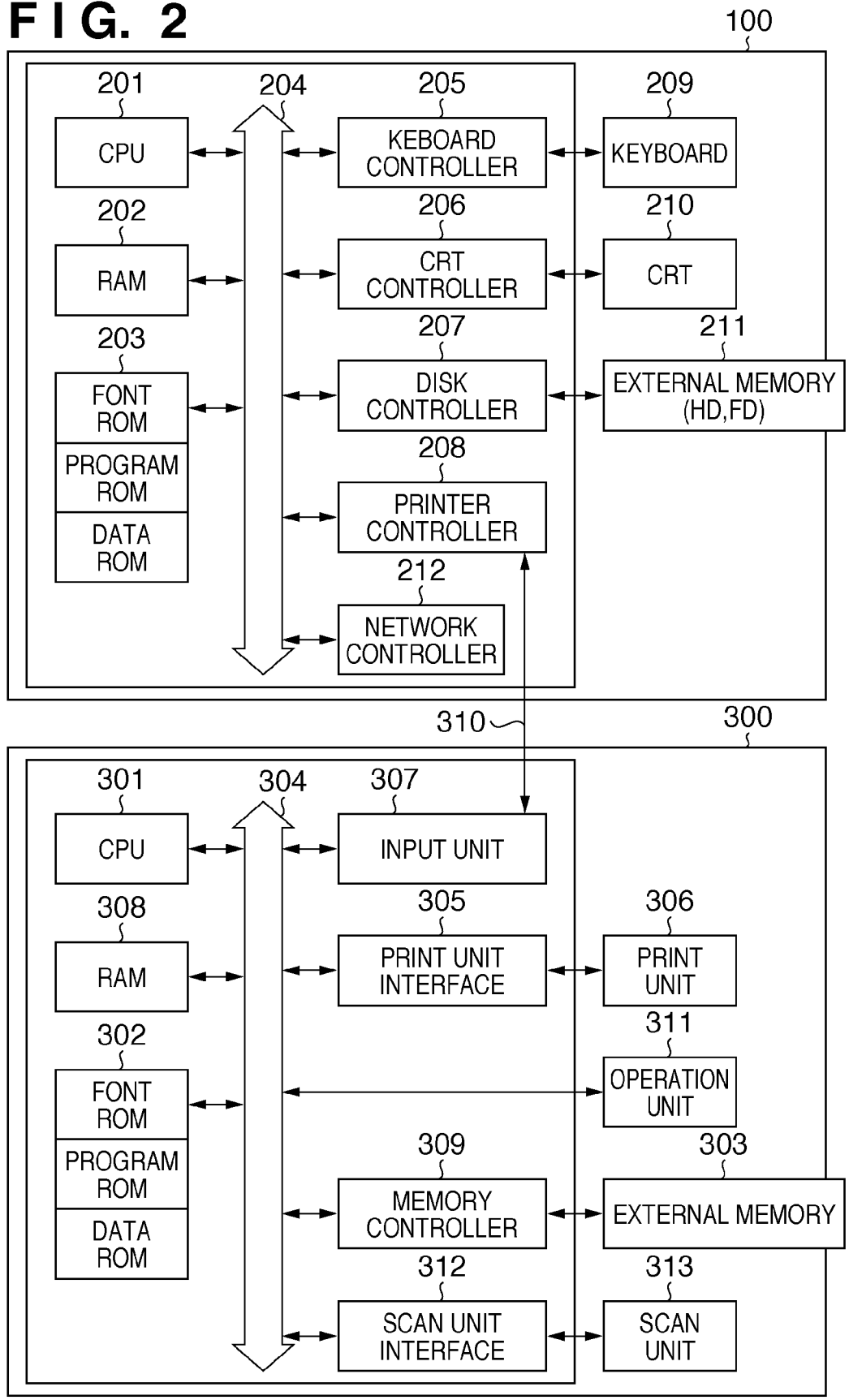
FIG. 2 shows exemplary hardware structures of a storage server and a client terminal shown in FIG. 1.

FIG. 2 shows exemplary hardware structures of the storage server and client terminal shown in FIG. 1. In FIG. 2, a host computer 100 indicates a computer apparatus that constitutes the storage server 1001, and an image forming apparatus 300 indicates a computer apparatus that constitutes the client terminal 1006. As shown in FIG. 2, the host computer 100 and image forming apparatus 300 are connected via a network etc. so as to be able to communicate with each other.

First is a description of the structure of the host computer 100. Note that the hardware block diagrams shown in FIG. 2 correspond to hardware block diagrams of general information processing apparatuses, and the hardware structure of a general information processing apparatus is applicable to the host computer 100 of the present embodiment. In FIG. 2, a CPU 201 executes programs such as an OS and applications that are stored in a program ROM of the ROM 203, or that have been loaded from a hard disk 211 to a RAM 202. The CPU 201 also controls blocks that are connected to a system bus 204. Here, "OS" is an abbreviation for an operating system that runs on a computer, and hereinafter the operating system is called an OS. The processing shown in later-described flowcharts can be realized by the execution of the above programs. The RAM 202 functions as a main memory, work area, etc. of the CPU 201. A keyboard controller (KBC) 205 controls key input from a keyboard 209 and a pointing device that is not shown in FIG. 2. A CRT controller (CRTC) 206 controls displays performed by a CRT display 210. A disk controller (DKC) 207 controls data accesses to, for example, a hard disk (HD) 211 or a floppy (registered trademark) disk (FD) that store various types of data. A PRTC 208 controls the exchange of signals with the image forming apparatus 300 connected to the host computer 100. Various modes of connection such as LAN and USB are applicable to a line 310 connecting the host computer 100 and the image forming apparatus 300. The network controller (NC) 212 is connected to the network and executes processing for controlling communication with other devices connected to the network. Here, additional image forming apparatuses and peripheral devices may be connected via the network.

Next is a description of the structure of the image forming apparatus 300. As shown in FIG. 2, the image forming apparatus 300 includes a CPU 301 that is the CPU of the image forming apparatus 300. The CPU 301 controls blocks that are connected to a system bus 304 based on a control program stored in a ROM 302 or an external memory 303. Image signals generated by the processing performed by the CPU 301 are output as output information to a print unit (image forming apparatus engine) 306 via a print unit interface 305. Also, the CPU 301 can perform processing for communicating with the host computer 100 via an input unit 307, and can transmit information etc. in the image forming apparatus 300 to the host computer 100. Control programs etc. of the CPU 301 are stored in a program ROM of the ROM 302. Font data etc. used when generating output information is stored in a font ROM of the ROM 302. In the case of an image forming apparatus that does not include a hard disk or other external memory 303, information etc. to be used in the host computer 100 is stored in a data ROM in the ROM 302. A RAM 308 functions as a main memory, work area, etc. for the CPU 301. The RAM 308 is constituted so that memory capacity can be extended by an optional RAM connected to an expansion port not shown in FIG. 2. Also, the RAM 308 is used as an output information expansion area, an environment data storage area, an NVRAM, and the like. Access to the external memory 303 is controlled by a memory controller (MC) 309. The external memory 303 is connected optionally and stores font data, an emulation program, form data, and the like. An operation unit 311 is constituted from a switch for performing an operation, an LED indicator, and the like. A scanner interface 312 corrects, manipulates, and edits image data received from a scan unit 313. The scan unit 313 converts image information into electrical signals by inputting, to a CCD, reflected light obtained by scanning light over an image on an original. Furthermore, the scan unit 313 converts the electrical signals into R (red), G (green), and B (blue) luminance signals, and reads the luminance signals as image data. When a user uses the operation unit 311 to instruct the commencement of reading, an original reading instruction is transmitted to the scan unit 313. The scan unit 313 performs an original reading operation upon receiving the original reading instruction. Note that the original reading method may be an automatic feed system set in an original feeder not shown in FIG. 2. Alternatively, the original reading method may be a method of placing an original on a glass surface not shown in FIG. 2, and scanning the original by moving a light exposing unit.

Figure 3:
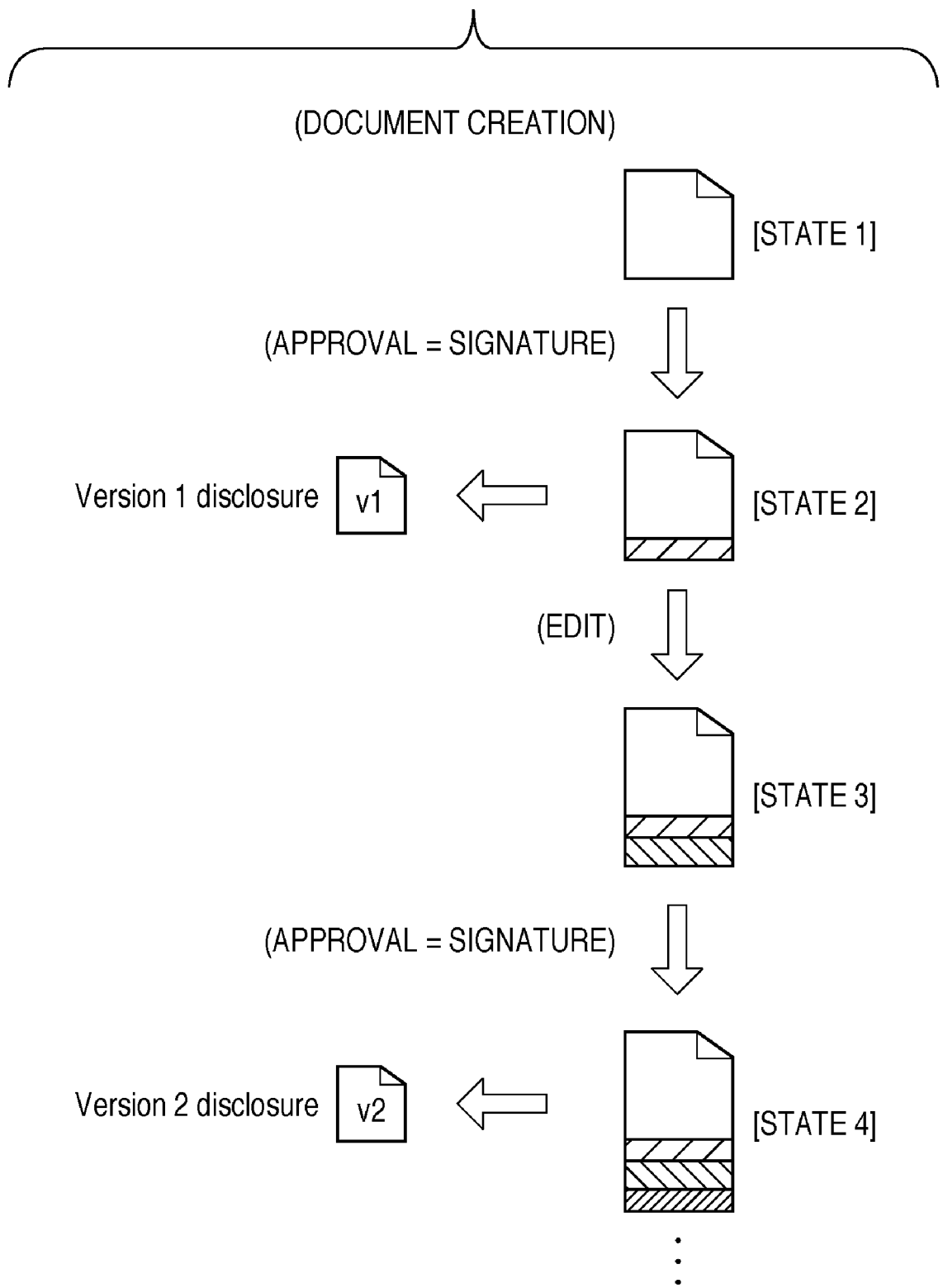
FIG. 3 shows a structure of data used by the system shown in FIG. 1.

FIG. 3 shows the structure of data used by the system shown in FIG. 1. As shown in FIG. 3, "state 1" indicates a case of a newly created document. As shown in "state 2", signature data is attached to the end of the data in "state 1" when the document is approved, that is to say, when the document is given a digital signature. In the present embodiment, the signature data first attached to the document is also called a "first signature". The above signature processing may be performed by the user attaching a digital signature with use of, for example, a document editing application installed on the client terminal 1006 or the functions of a storage server. Also, the document in "state 2" is generally called version 1.

In the present embodiment, signature information includes a certificate and a hash value that relates to the document to which the signature is to be attached. Also, in the present embodiment, the certificate describes the serial number of the certificate, information indicating which server issued the certificate, information regarding the holder of the certificate, the system to which the holder belongs, etc., and information such as the expiration date of the certificate.

Furthermore, when the document in "state 2" is edited, the editing content is attached to the end of the document in state 2 as edit data, as shown in "state 3". As shown in "state 4", signature data is attached to the end of the data in "state 3" when the document is approved again, that is to say, when the document is given a digital signature. In the present embodiment, the second signature data attached to the document is also called a "second signature". Similarly to as described above, this signature data attachment processing may be performed by the user attaching a digital signature with use of, for example, a document editing application installed on the client terminal 1006 or the functions of a storage server. Also, the document in "state 4" is generally called version 2. In the present embodiment, pieces of signature data such as the "first signature" and "second signature" attached to a newly created document (state 1 shown in FIG. 3) are collectively called "signature information". In this way, the signature data pieces enable identifying which place in successive order the signatures were attached to the document, thus associating the signatures with the editing history.

Figure 4:
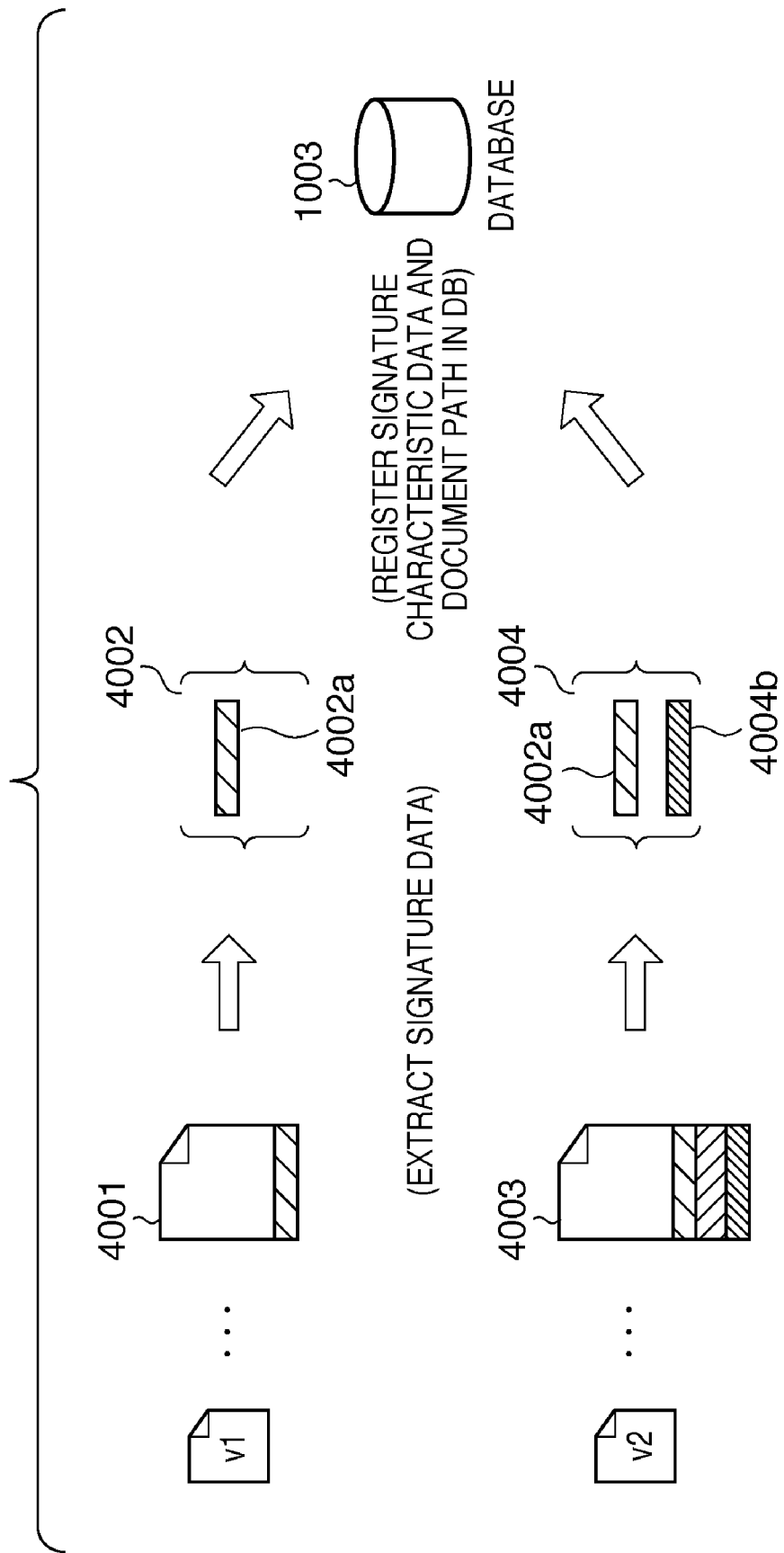
FIG. 4 shows an outline of indexing processing performed by an indexing service in a search server.

FIG. 4 shows an outline of indexing processing performed by the indexing service in the search server. The following describes an outline of the indexing processing of the present embodiment with reference to FIG. 4.

Document data 4001 is document data corresponding to version 1. Signature information 4002 indicates all the signature data pieces attached to the document data 4001, and signature data 4002a indicates the first one of the signature data pieces. Document data 4003 is document data corresponding to version 2. Signature information 4004 indicates all the signature data pieces attached to the document data 4003. The signature information 4004 includes the signature data 4002a that was attached first and signature data 4004b that was attached second. The database 1003 stores the extracted signature information 4002 and 4004 and location information pertaining to the document.

Figure 5:
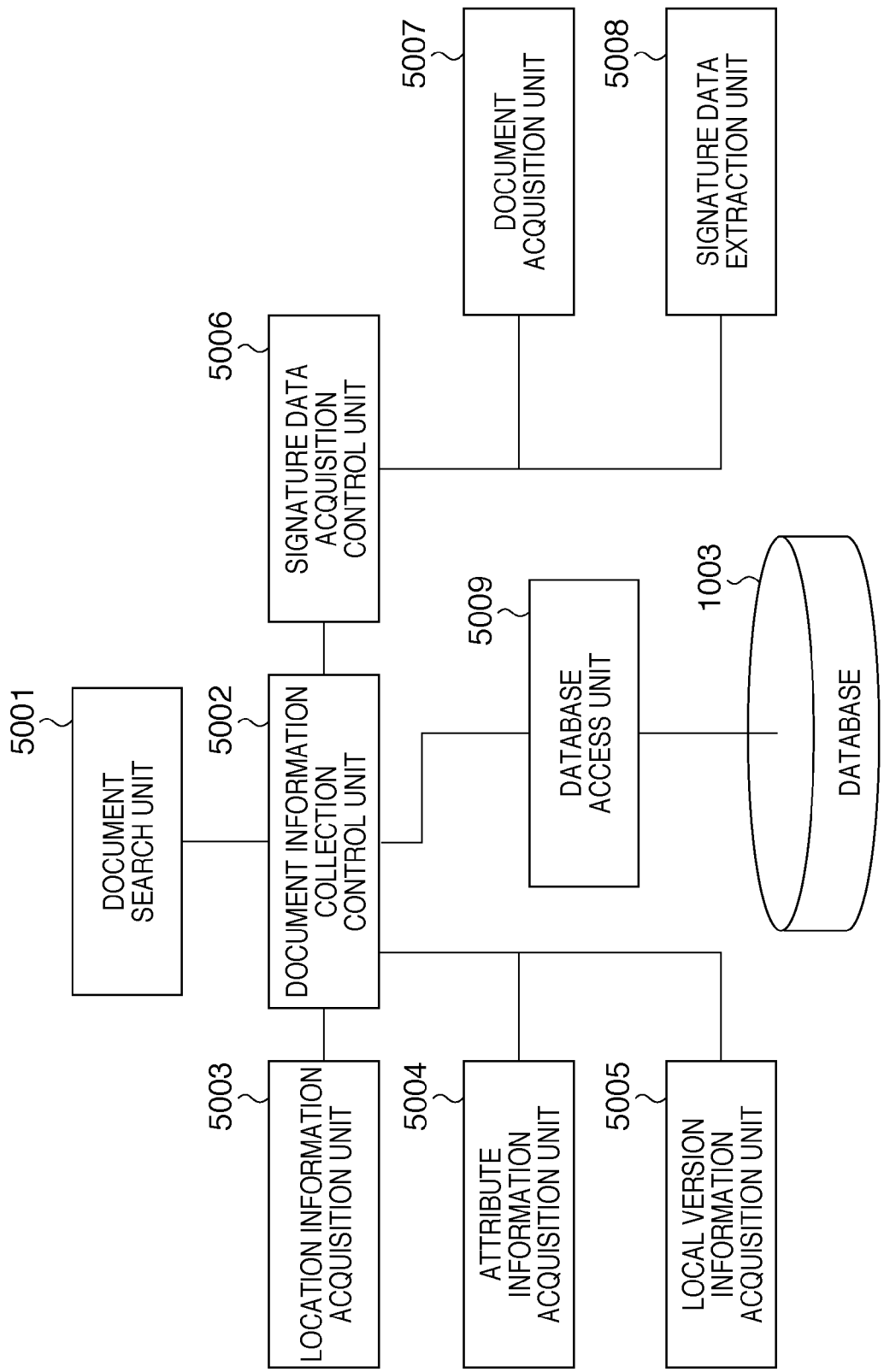
FIG. 5 shows a modular structure of the indexing service in the search server.

FIG. 5 shows a modular structure of the indexing service in the search server. The following describes the roles of the modules in the indexing server of the present embodiment with reference to FIG. 5.

A module 5001 is a document search unit that accesses a document on the network and detects whether the accessed document is an indexing target by judging whether the accessed document requires indexing. The judgment method is a method of, for example, comparing the accessed document to document information that has the same location information registered in the database 1003, and judging whether the update date has changed and whether the document hash value has changed.

A module 5002 is a document information collection control unit that controls the collection of document information required for indexing. A module 5003 is a location information acquisition unit that acquires the location information of the document detected by the module 5001. A module 5004 is an attribute information acquisition unit that acquires attribute information such as the update date of the document detected by the module 5001. A module 5005 is a local version information acquisition unit that judges whether the document detected by the module 5001 includes local version information that is acquirable and indicates an editing history that is accumulated each time the document is edited. In a case of judging affirmatively, the module 5005 acquires the local version information.

A module 5006 is a signature data acquisition control unit that controls processing for acquiring the signature data attached to the document detected by the module 5001. A module 5007 is a document acquisition unit that acquires document data indicated by an instruction received from the module 5006. A module 5008 is a signature data extraction unit that extracts signature data from document data received from the module 5006. A module 5009 is a database access unit that stores various types of information pertaining to a document in the database 1003 or retrieves such data from the database 1003. The database 1003 stores the various types of document information collected by the module 5002.

Figure 6:
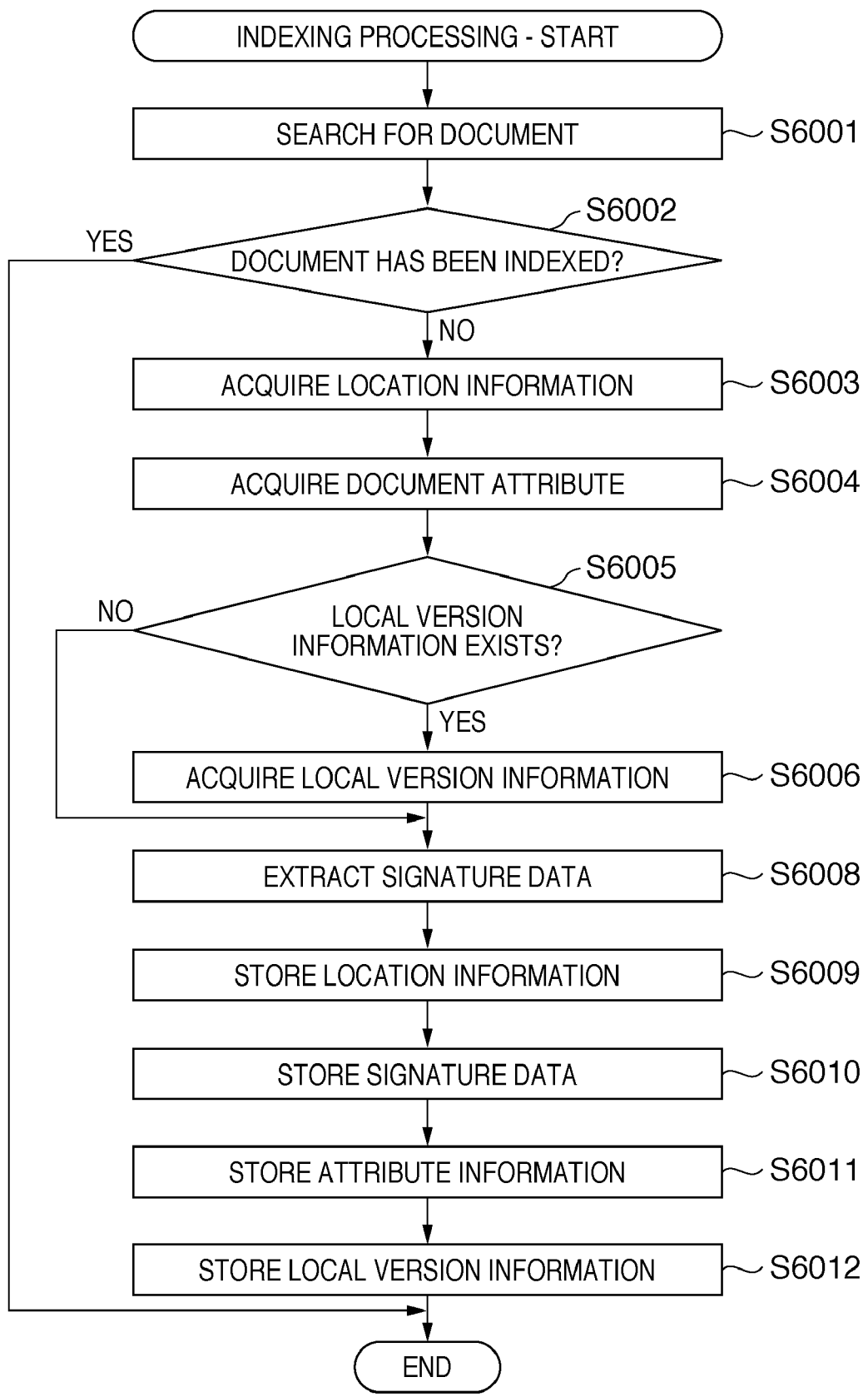
FIG. 6 is a flowchart showing processing performed by the indexing service in the search server.

FIG. 6 is a flowchart showing processing performed by the indexing service in the search server.

First, in step S6001, the document search unit indicated by the module 5001 periodically (e.g., every night) searches for a document that exists on the network. If a document is detected, in step S6002 the module 5001 judges whether the detected document has already been indexed. This judgment may be performed by comparing the detected document to document information having the same location information registered in the database 1003. Also, this judgment may be performed by judging whether the update date has changed or the document hash value has changed. Processing ends if the detected document is judged to already have been indexed. However, if the detected document is judged to not yet be indexed, the document information collection control unit indicated by the module 5002 collects various types of information pertaining to the detected document.

In step S6003, the module 5002 acquires the location information of the document via the location information acquisition unit indicated by the module 5003. Next, in step S6004 the attribute information acquisition unit indicated by the module 5004 acquires the attribute information of the document. In step S6005, whether the document includes local version information is judged. If the document is judged to include local version information, processing proceeds to step S6006 in which the local version information acquisition unit indicated by the module 5005 acquires the local version information of the document. If the document is judged to not include local version information, processing proceeds to step S6008.

Next, in step S6008 the module 5002 instructs the signature data acquisition control unit indicated by the module 5006 to acquire the signature data of the document. The module 5006 acquires the document via the document acquisition unit indicated by the module 5007, and transmits the acquired document to the signature data extraction unit indicated by the module 5008. The module 5008 extracts the signature data and transmits the extracted signature data to the module 5002. In steps S6009 to S6012, the module 5002 stores the various types of collected information in the database 1003 via the database access unit indicated by the module 5009. Here, the various types of information refer to location information, signature data, attribute information, and local version information.

Figure 7:
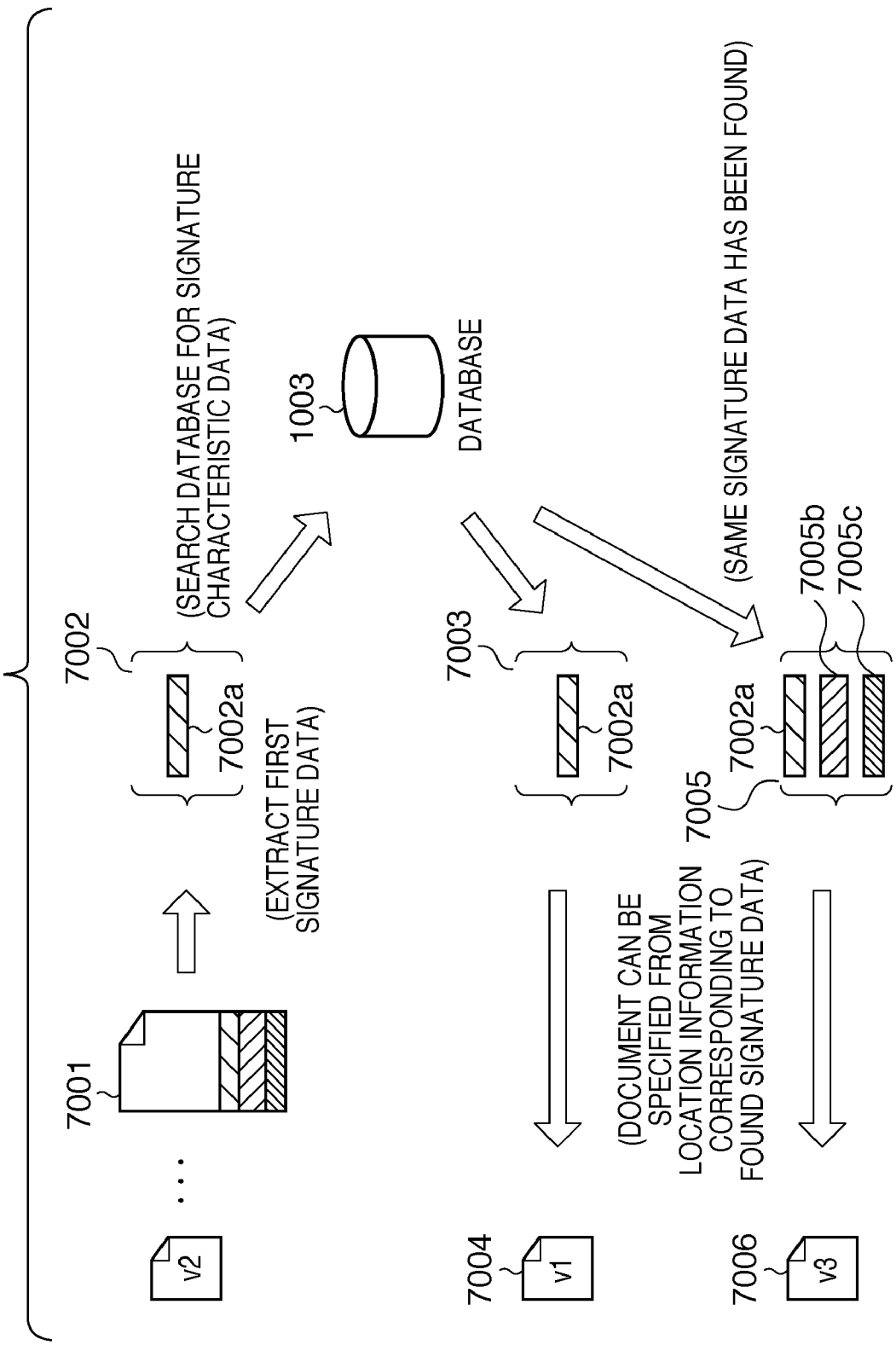
FIG. 7 shows an outline of search processing performed by a search service in the search server.

FIG. 7 shows an outline of search processing performed by the search service in the search server. The following describes an outline of the search processing of the present embodiment with reference to FIG. 7.

Document data 7001 is document data corresponding to version 2. In the present embodiment, the user has designated the document data 7001 as the search base document. Signature data 7002a included in signature information 7002 indicates, from among the signature data pieces attached to the document data 7001, the signature data piece that was attached first. The signature data 7002a is extracted from the document data 7001 by the search service. The search service uses pattern matching or the like to search the signature data registered in the database 1003 for signature information including signature data that matches the signature data 7002a. FIG. 7 shows an exemplary search result in which signature information 7003 and 7005 includes signature data that matches the signature data 7002a. The signature information 7003 and 7005 respectively correspond to document data 7004 and 7006 that respectively correspond to versions 1 and 3. The signature information 7005 includes the signature data 7002a that was attached first, signature data 7005b that was attached second, and signature data 7005c that was attached third. Location information associated with such signature data is also stored in the database 1003. Accordingly, the search service can provide the user with the version numbers of documents that are in the same document lineage and dispersed across the network, and location information able to specify the actual documents.

Figure 8:
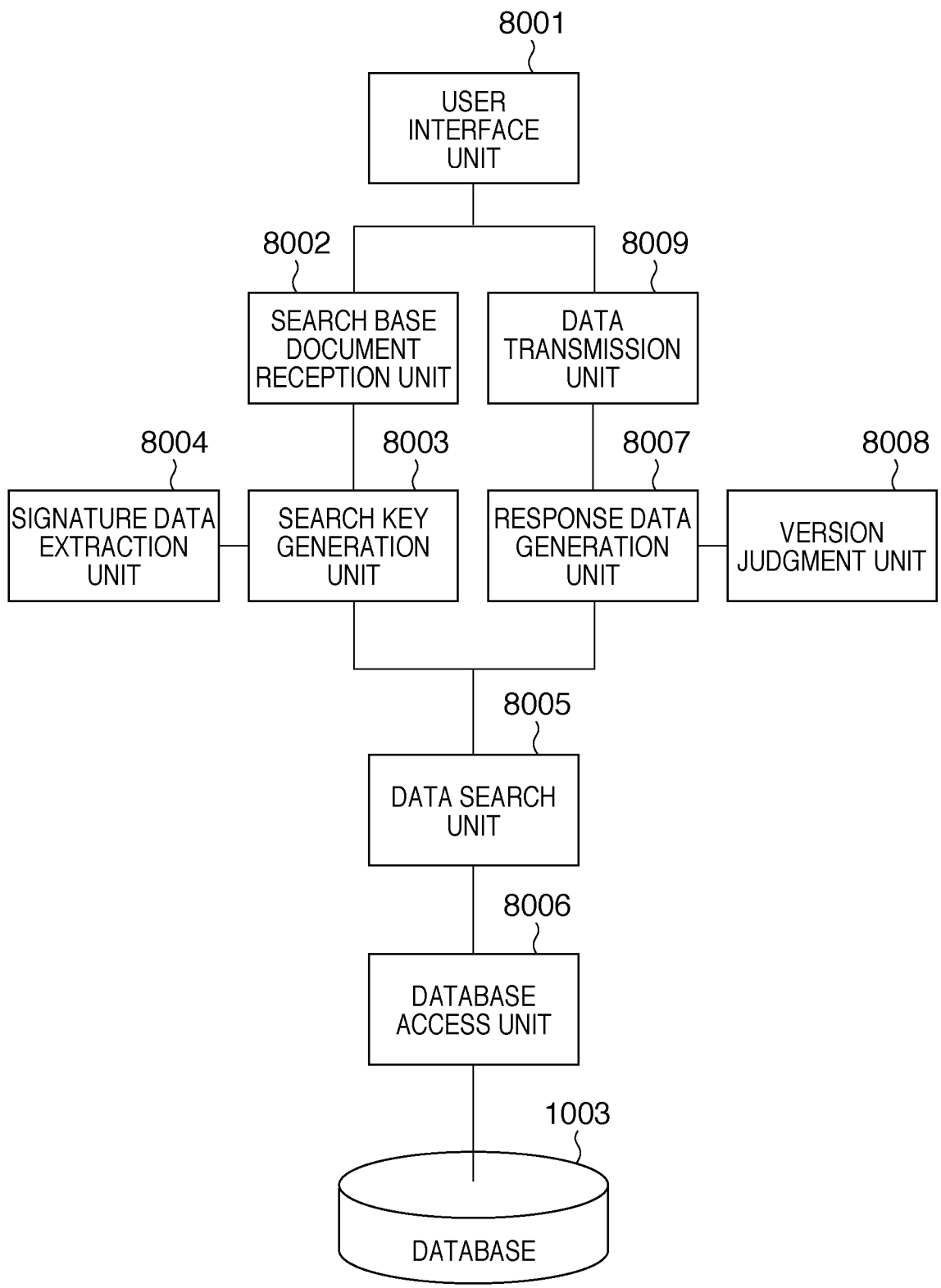
FIG. 8 shows a modular structure of the search service in the search server.

FIG. 8 shows a modular structure of the search service in the search server. The following describes the roles played by the modules in the search service of the present embodiment with reference to FIG. 8.

A module 8001 is a user interface unit via which the user designates a search base document or receives a result. A module 8002 is a search base document reception unit that receives document data pertaining to the document designated as the search base document by the module 8001. A module 8003 is a search key generation unit that controls the generation of a search key based on the received document. A module 8004 is a signature data extraction unit that extracts signature data from the document data designated by the module 8003. A module 8005 is a data search unit that performs search processing according to the search key generated by the module 8003. A module 8006 is a database access unit that accesses the database 1003. A module 8007 is a response data generation unit that controls the generation of response data based on a search result received from the module 8005. For example, the module 8007 performs, with use of the module 8008, version judgment on the document included in the search result, judgment of whether the document included in the search result is a document from a main lineage, and the like, and generates response data in accordance with the judgment results. The module 8008 is a version judgment unit that performs version judgment processing based on the signature data of the document received from the module 8007. For example, the module 8008 judges that the document including the signature information 7003 shown in FIG. 7 is version 1 since only one signature is attached to the document, and judges that the document including the signature information 7005 is version 3 since three signatures are attached to the document. The module 8008 may also perform judgment processing such as judging, based on department information, signer information, etc. included in the signature data, that documents are in the main document lineage if all of the signatures attached to the documents were attached by the same department. A module 8009 is a data transmission unit that transmits the response data generated by the module 8007 to the module 8001.

Figure 9:
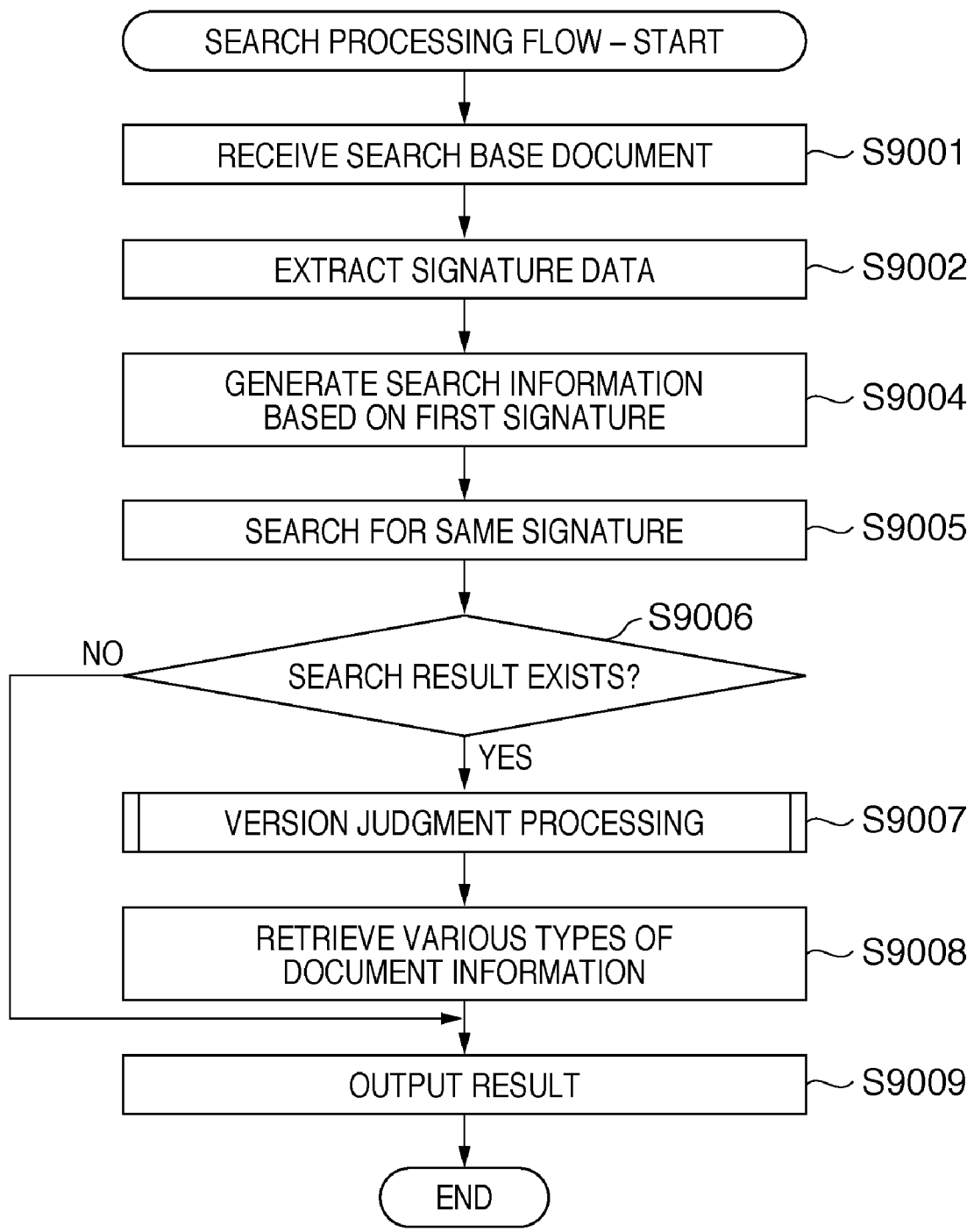
FIG. 9 is a flowchart showing processing performed by the search service in the search server.

FIG. 9 is a flowchart showing processing performed by the search service in the search server.

First, in step S9001 the search base document reception unit indicated by the module 8002 receives the document designated by the user as the search base document via the user interface unit indicated by the module 8001. Next, in step S9002 the search key generation unit indicated by the module 8003 extracts the first signature attached to the document via the signature data extraction unit indicated by the module 8004.

Next, in step S9004, the search key generation unit indicated by the module 8003 generates search information based on the extracted first signature. For example, the search key generation unit generates search information by extracting a hash value from the first signature.

In step S9005, the data search unit indicated by the module 8005 searches, with use of the search key generated by the search key generation unit, the database 1003 for signatures that are the same as the extracted first signature via the database access unit indicated by the module 8006. In the case of only using part of the signature data (e.g., only the hash value) as the search key, the module 8005 judges whether the signatures are the same as the extracted first signature by checking whether the found signature data is the same as the first signature extracted from the search base document.

In step S9006, the module 8005 judges whether a search result exists. If data including the same signature as the first signature of the search base document is not found, the data transmission unit indicated by the module 8009 transmits data indicating that no data was found to the module 8001. If data including the same signature as the first signature of the search base document is found, processing proceeds to step S9007 in which the version judgment unit indicated by the module 8008 performs the version judgment. Details of the version judgment are described later. Along with the performance of the version judgment, in step S9008 the response data generation unit extracts location information, signature data, attribute information, local version information, etc. from a document corresponding to a found document via the module 8005, and generates response data with use of the extracted data and information. In step S9009, the module 8009 transmits the generated response data to the module 8001 as a search result. Upon receiving the search result, the module 8001 displays the search result to the user.

Figure 10:
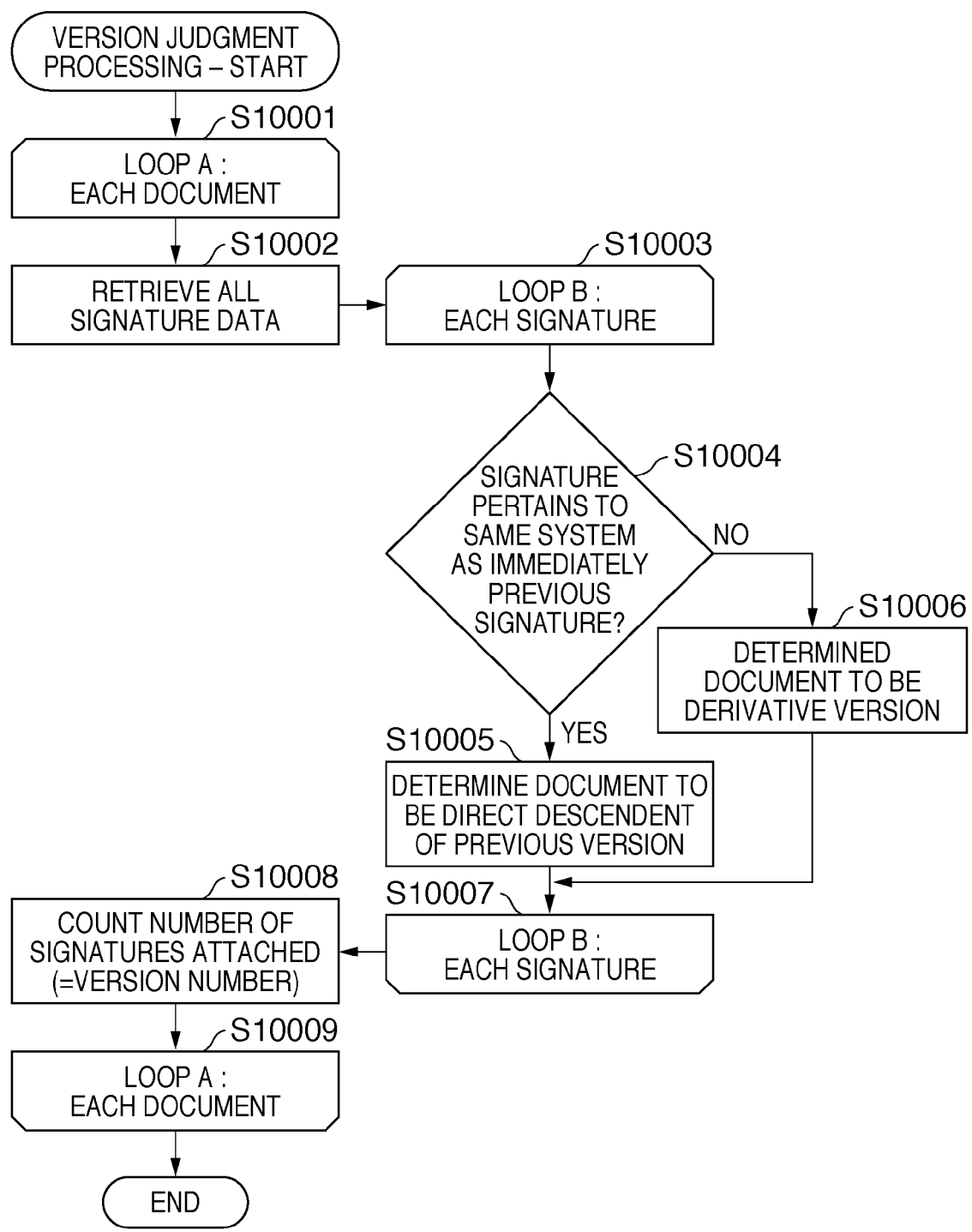
FIG. 10 is a flowchart showing version judgment processing that is shown in FIG. 9.

FIG. 10 is a flowchart showing version judgment processing that is shown in FIG. 9. The version judgment processing shown in the flowchart of FIG. 10 is performed on each document. In other words, the processing loop from step S10001 to S10009 is repeated for each document received from the module 8008.

First, in step S10002 each signature attached to a received document is retrieved from the database 1003.

Next, the processing loop from step S10003 to S10007 is repeated for each of the signatures in order beginning with the second signature. First, in step S10004 a judgment is made as to whether the signature being focused on pertains to the same system (or to the same person or same piece of other data) as the immediately previous signature. If the signature being focused on pertains to the same system as the immediately previous signature, processing proceeds to step S10005. In step S10005, the document is judged to have been maintained in continuation by the same system (or same person or same piece of other data) as the version to which the immediately previous signature is attached, and the document is treated as a direct descendant of the previous version. If the signature being focused on does not pertain to the same system as the immediately previous signature, in step S10006 the document is treated as a version that was derived from the previous version. When the above processing has been performed on all the signature data, in step the number of signature data pieces attached to the document is counted and determined to be the major version number of the document.

Figure 11:
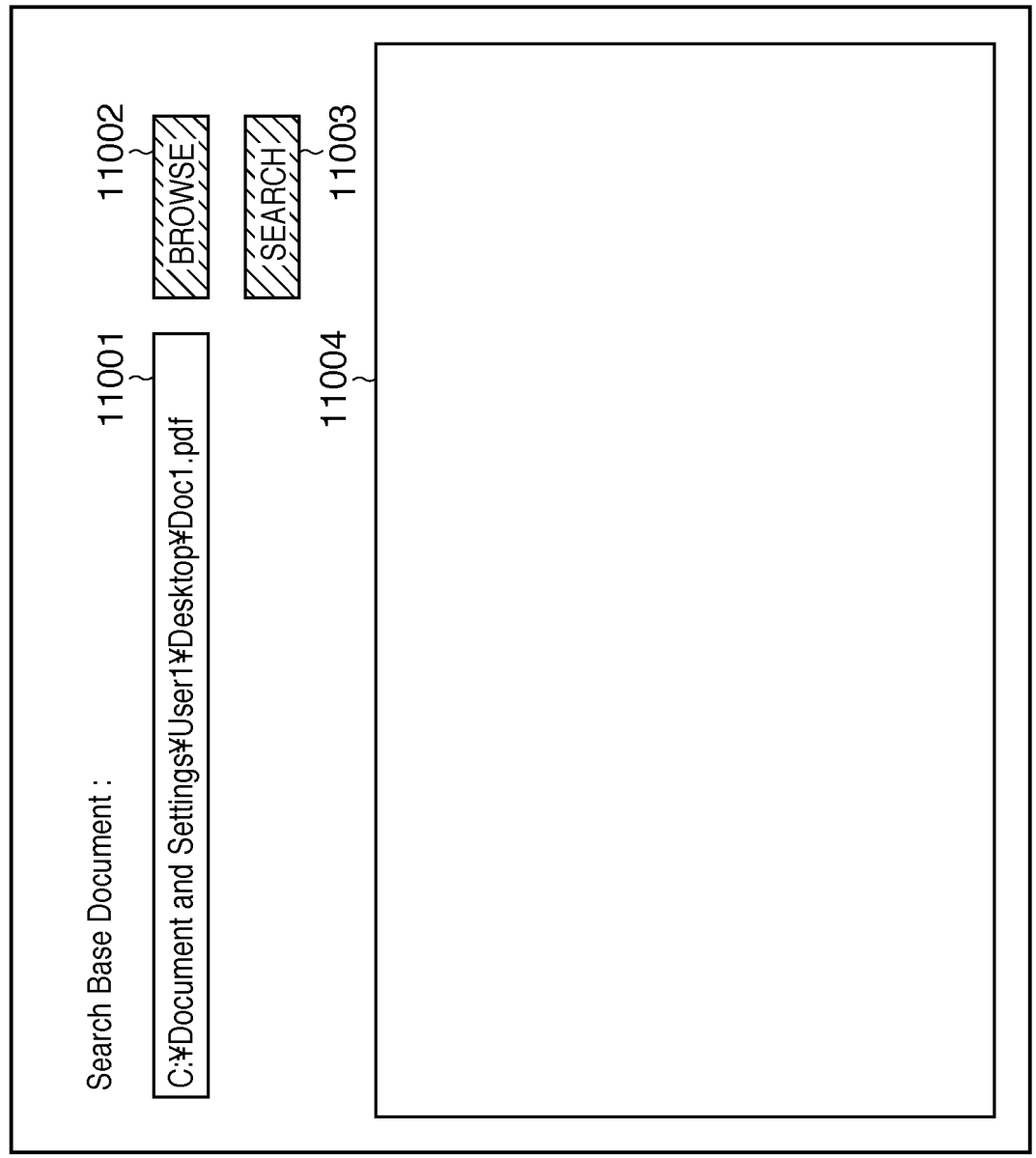
FIG. 11 shows an exemplary search dialogue display in the embodiment.

FIG. 11 shows an exemplary search dialogue display in the embodiment. The search dialogue shown in FIG. 11 is displayed when the user performs a search.

A text box 11001 displays or receives an input of the document path and document name of the search base document. A button 11002 is a document browse dialogue display button used when searching a file system etc. for information to be displayed in the text box 11001. The document path and document name of the document designated in the document browse dialogue is input to the text box 11001. When a button 11003 is pressed, the document designated in the text box 11001 is transmitted to the module 8002 of the search service, and search processing is started. A display 11004 is a result output window that displays a search result.

Figure 12:
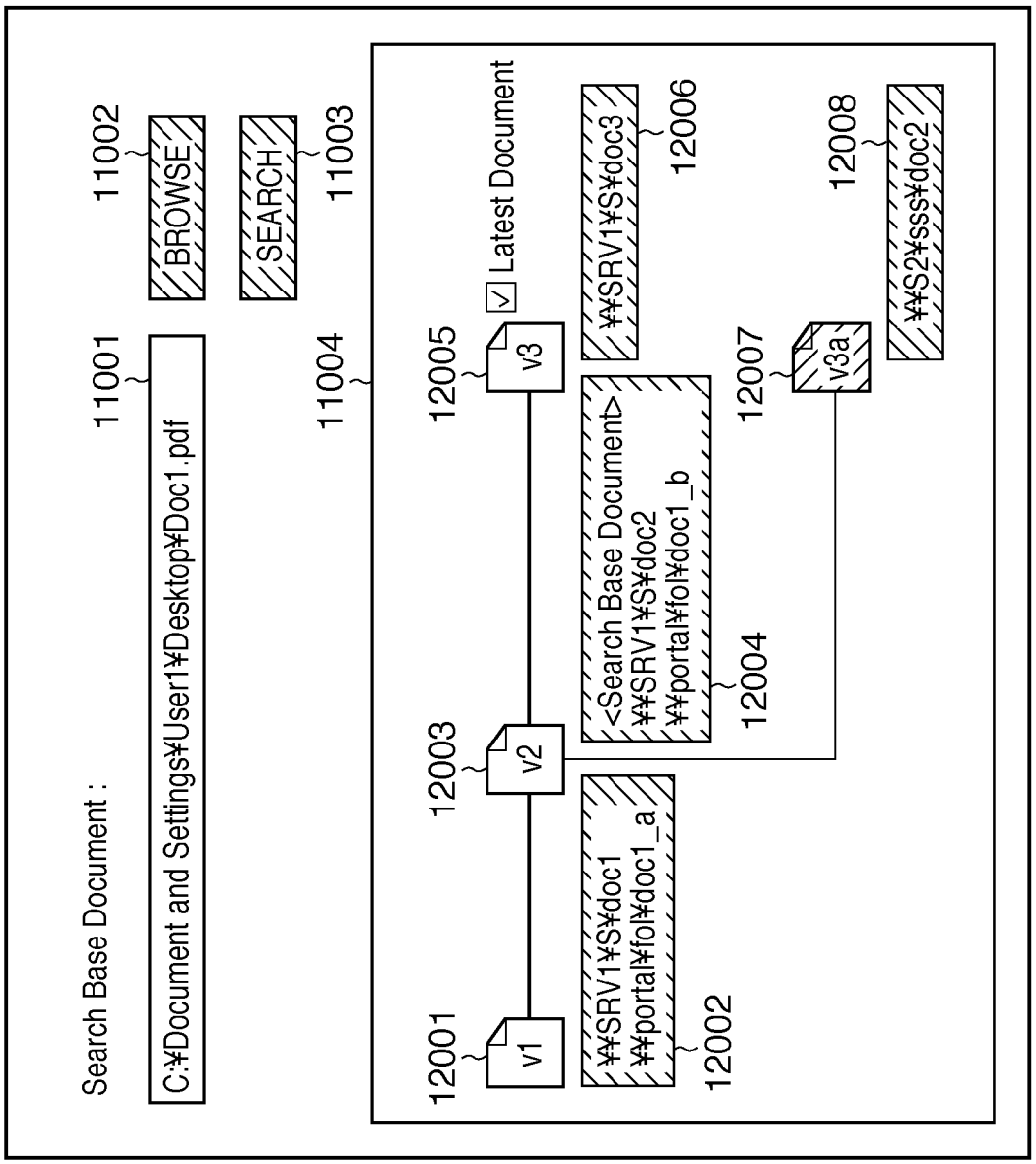
FIG. 12 shows an exemplary search result in the embodiment.

FIG. 12 shows an exemplary search result in the embodiment. The search result is displayed in the display 11004 shown in FIG. 11. In the present embodiment, the search server 1005 fulfills the role of a display control unit that performs controls so that document information and version information are displayed in association with each other on the client terminal 1006.

An icon 12001 indicates version 1 of a document. A display 12002 displays a list of locations where version 1 of the document actually exists. In FIG. 12, the display 12002 indicates that two copies of version 1 of the document exist. An icon 12003 indicates version 2 of the document. A display 12004 displays a list of locations where version 2 of the document actually exists. In FIG. 12, the display 12004 indicates that three copies of version 2 of the document exist. The display 12004 also indicates that one of the three copies of version 2 is the search base document.

An icon 12005 indicates version 3 of the document. As shown in FIG. 12, near the icon 12005 is a mark indicating that version 3 of the document is the latest version, thereby enabling the user to be aware that the document indicated by the icon 12005 is the latest version. A display 12006 displays a list of locations where version 3 of the document exists. In FIG. 12, the display 12006 indicates that version 3 of the document exists at only one location.

An icon 12007 indicates a document that is a modified version of version 2. A display 12008 displays a list of locations where the document indicated by the icon 12007 exists.

In the displays 12002, 12004, 12006, and 12008, the character strings indicating location information are linked to the actual documents, and the actual documents can be downloaded or displayed by, for example, designating the character strings with use of a mouse etc.

Although only document paths and document names are displayed in the displays 12002, 12004, 12006, and 12008 of FIG. 12, information such as an update date, an author, a signer, and a signatory organization may also be displayed. Also, the bold solid lines connecting the icons 12001, 12003, and 12005 indicate main lineage versions (legitimate versions) that are revised versions and have been signed by the same department or signer as the signature of version 1. On the other hand, the thin solid line connecting the icons 12003 and 12007 indicate a derivative version.

In this way, the present embodiment enables automatically detecting the association between versions of a document that are dispersed across a network based on signature data attached to the versions, and searching for and retrieving versions of a designated document. In this case, the present embodiment is applicable to documents that have been dispersed across a network by not only operations managed by the document management system, but also by various methods such as email, where the storage location cannot be managed by the document management system.

Furthermore, even if a document is saved under a different name, whether the document is the same as or a derivation of the search basis document can be judged accurately based the signature data. Also, tampering etc. can be easily detected since the judgment processing is performed based on signature data, which is highly reliable. This enables detecting legitimate version information with high reliability.

Figure 13:
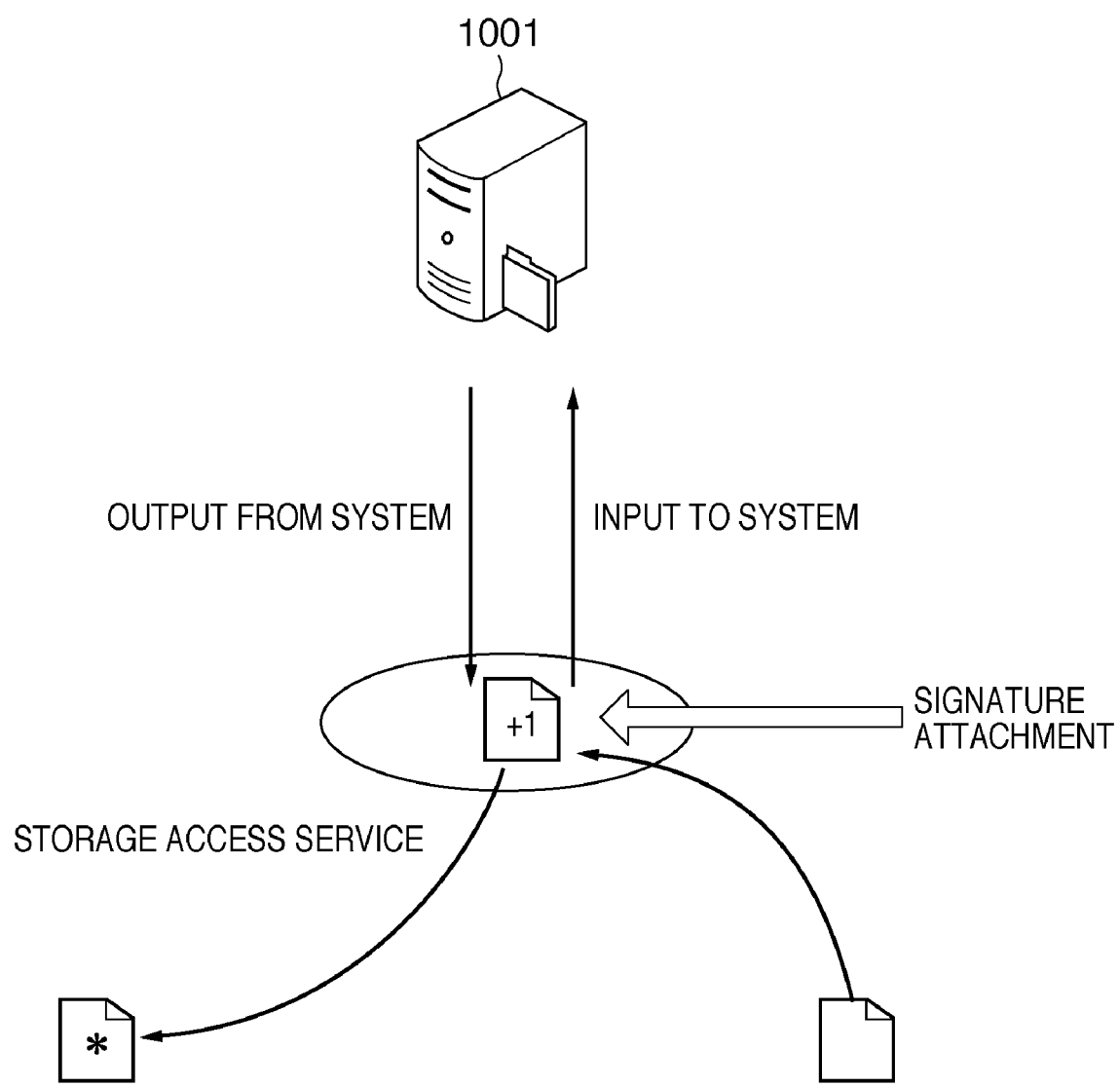
FIG. 13 shows a structure in which a signature is assigned via a document storage server access service in the embodiment.

The present embodiment is based on the assumption that a signature is attached when the user is performing an operation. However, as shown in the example of FIG. 13, when performing processing for inputting a document to or outputting a document from the storage server 1001, the document may be caused to always be input/output via a storage access service that attaches a signature.

In general, when editing a document in a basic client server system, an access component such as the storage access service downloads the document from the storage server to the client terminal. After the editing, an access component such as the storage access service again stores the edited document in the storage server. Therefore, a signature is automatically attached when the document is input to and output from the storage server 1001. Accordingly, even if a downloaded file is dispersed across a network, a search can be performed without the user being conscious of signature attachment as long as the downloaded file has been stored in the storage server. This enhances user-friendliness and expands the range of documents that can be searched.

Figure 14:
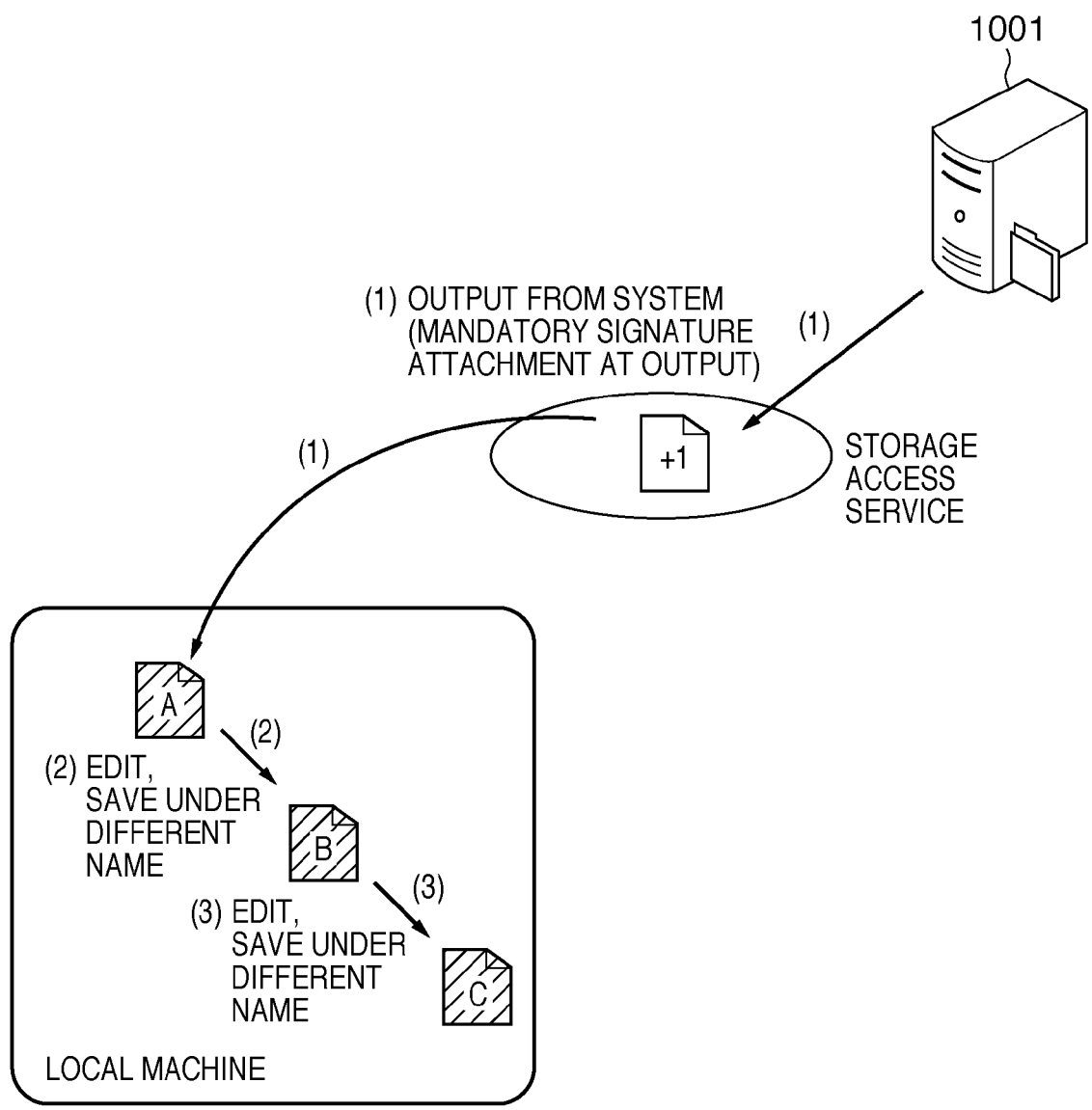
FIG. 14 illustrates a case in which a user performs an editing update in the local environment of a client terminal or another server.

In the above description, version judgment is performed based only on signatures. As shown in FIG. 14, if the user moves a document to a client terminal or other server and then edits the document in the local environment of the client terminal or other server, the edited documents would all be judged to be the same version as the document output from the storage server 1001.

In view of this, in the case of a document that includes an editing record after the last attached signature, the version judgment unit indicated by the module 8008 may be caused to perform version judgment based on the signature data and furthermore perform revision generation processing.

Figure 15:
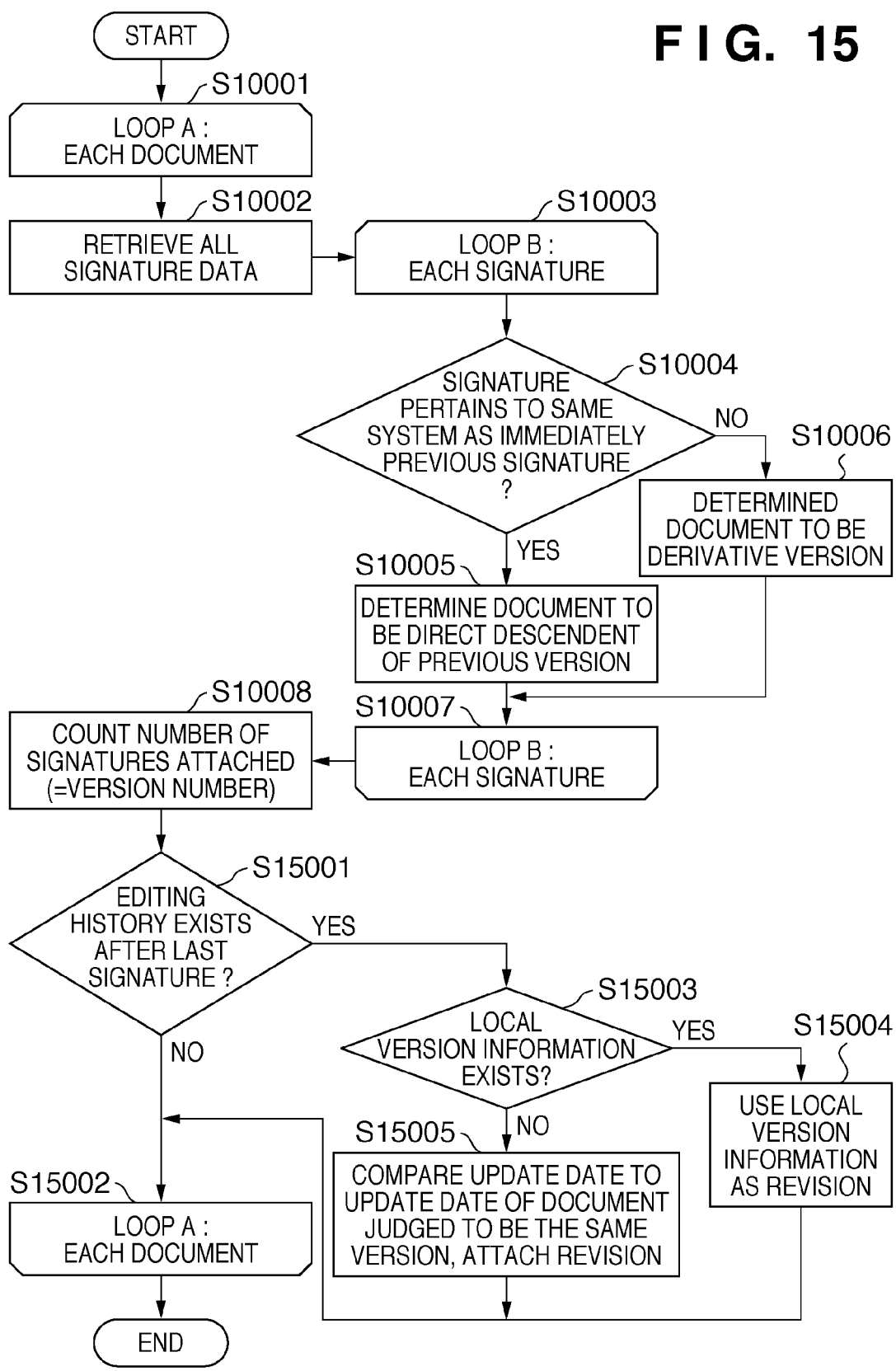
FIG. 15 is a flowchart showing revision generation processing in the embodiment.

FIG. 15 is a flowchart showing revision generation processing in the embodiment. The flowchart of FIG. 15 shows the processing of steps S10001 to S10008 described in FIG. 10, with the addition of the processing of step S15001 to S15005.

From steps S10001 to S10008 of FIG. 15, the same processing as in FIG. 10 is performed, thereby resulting in the establishment of a version number. Then in step S15001, a judgment is made as to whether the document includes an editing record after the last attached signature. If the document is judged to include an editing record after the last attached signature, processing proceeds to step S15003 in which a judgment is made as to whether the document includes local version information that can be used next. If the document is judged to include local version information that can be used next, in step S15004 the local version information is used as revision information. However, if the document is judged to not include local version information that can be used, in step S15005 a comparison is performed between the update dates of the documents judged to be the same version. The document having the older date is considered to be the small revision, and the document having the newer date is considered to be the larger revision. As shown in the flowchart of FIG. 15, if all of the editing records in the document correspond to the document signatures, the document is determined to be a legitimate version based on the last attached signature. However, if any of the editing records do not correspond to the document signatures, the document is determined to be a derivative version (revision).

The version judgment method based on the local version information and update date cannot be said to be sufficiently more reliable than the judgment method based on signature data. Therefore, the user interface that displays results may be innovated so as to indicate to the user that the local version information and update date are reference information.

Figure 16:
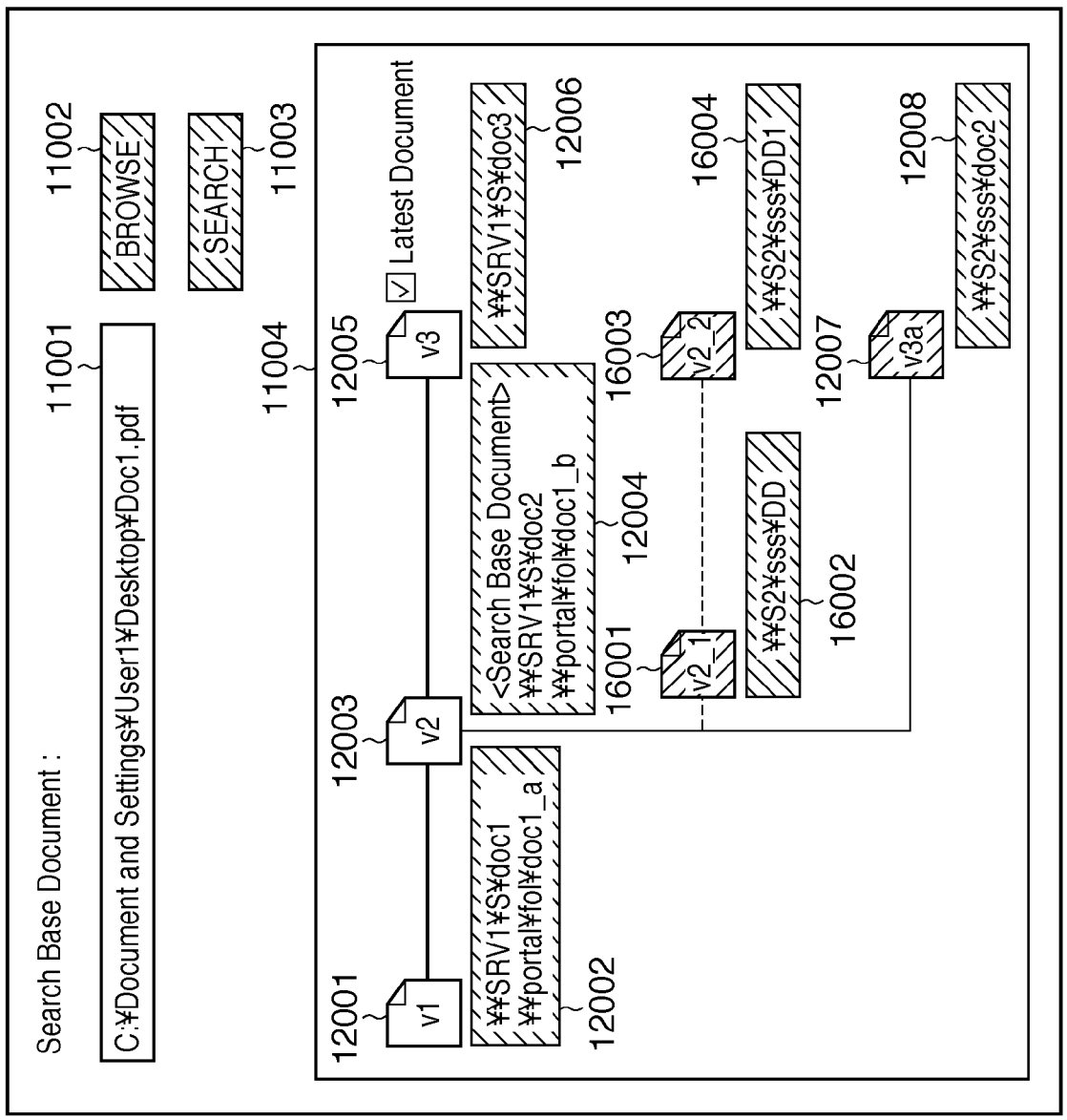
FIG. 16 shows another exemplary search result in the embodiment.

FIG. 16 shows another exemplary search result in the embodiment. In FIG. 16, icon 16001 with display 16002 and icon 16003 with display 16004 are connected by a broken line, unlike a solid line that indicates a judgment performed based only on signature data.

In the present embodiment, displaying a result such as shown in FIG. 16 enables performing more detailed version judgment even in a case in which a signature is not attached after the editing of a document dispersed off of the storage server that mandatorily attaches signatures at the time of input and output.

Based on the above description, when a user designates a certain document to be searched for, the present embodiment enables the retrieval of related versions of the same document that are dispersed across a network. The present embodiment can be applied to cases of using not only a search function, but also other functions. For example, in the case of instructing a document to be printed, processing to when the button 11003 of FIG. 11 is pressed may be performed to search for related documents and automatically judge whether there exists a document that is newer than the document that the user instructed to be printed. In this case, if a newer document does not exist, the printing is executed as originally instructed. If a newer document exists, a message box may be displayed on the user interface, and the user may be prompted to select whether to print the newer document instead of the designated document. Consequently, automatically judging whether a newer document exists before printing enables preventing the re-printing of a document due to mistakenly printing an older document. This also saves the trouble of searching for similar documents and checking whether a similar document is a newer document before printing.

The document management system of the present embodiment can judge whether similar documents dispersed across a network are the same document or different documents derived from the same document. The document management system of the present embodiment can furthermore automatically detect the newer/older relationship between documents derived from the same document and reveal the version relationship therebetween. Even if documents are dispersed across a network by various methods such as email, the document management system of the present embodiment can detect the version information (signature) of a document, and, based on the detected version information, search for or retrieve different versions of the document that are related to the document.

The present invention also includes a case in which the functions of the above-described embodiment are realized by an operating system (OS) or the like running on a computer performing part or all of the actual processing based on instructions in program code (a search program). Furthermore, the present invention is applicable even if program code read from a storage medium has been written to a memory included in a function expansion card inserted into the computer or a function expansion unit connected to the computer. In this case, the functions of the above-described embodiment are realized by a CPU or the like included in the function expansion card or function expansion unit performing part or all of the actual processing based on instructions in the program code written to the memory.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-028120, filed Feb. 7, 2008, which is hereby incorporated by reference herein in its entirety.

What is claimed is:

1. A document management system including a database having registered therein signature information of a document and document information that includes location information indicating a storage location of the document, the document information and the signature information being registered in association with each other, the document management system comprising:
   a reception unit configured to receive a designated document that has been designated by a user;
   an extraction unit configured to extract signature information from the designated document received by the reception unit;
   a search unit configured to search the database for another document having signature information that matches the signature information extracted by the extraction unit, the another document being a different version of the designated document; and
   a display control unit configured to, based on a result of the search performed by the search unit, perform control to display document information of the designated document and document information of the another document in association with version information determined based on the signature information;
   wherein
   the search unit searches for the another document whose signature information registered in the database includes a first signature that matches a first signature included in the signature information extracted by the extraction unit, and
   in each document, the first signature is a signature that was attached to the document first;
   wherein
   in each document, the document information includes an editing history that is accumulated each time the document has been edited, and
   the document management system further comprises:
   an attachment unit configured to, for each document to be newly registered in the database, attach a first signature to the document to be newly registered, and, for each document in which an editing history is to be newly accumulated, attach another signature to the document in correspondence with the newly accumulated editing history, the another signature enabling identification of which place in sequential order the another signature was attached;
   and
   wherein the reception unit, the extraction unit, the search unit, the display control unit and the attachment unit are implemented, at least in part, by hardware components of the document management system.

2. The document management system of claim 1, wherein the search unit performs the search with use of a hash value based on the signature information.

3. The document management system of claim 1, further comprising:
   a determination unit configured to, for each document, determine the version information of the document based on a signature included in the signature information of the document.

4. The document management system of claim 3, wherein
   in each document, the version information indicates whether the document is a legitimate version or a derivative version, and
   when determining the version information of each document, if each editing history of the document corresponds to a signature of the document, the determination unit determines the version information of the document to indicate that the document is a legitimate version based on a last attached signature, and if any editing history of the document does not correspond to a signature of the document, the determination unit determines the version information of the document to indicate that the document is a derivative version based on date information included in the editing history that does not correspond to a signature of the document.

5. The document management system of claim 4, wherein the display control unit controls the display so as to enable identification of whether each document is a legitimate version or a derivative version.

6. A document management method performed in a document management system including a database having registered therein signature information of a document and document information that includes location information indicating a storage location of the document, the document information and the signature information being registered in association with each other, the document management method comprising the steps of:
   receiving a designated document that has been designated by a user;
   extracting signature information from the designated document received in the reception step;
   searching the database for another document having signature information that matches the signature information extracted in the extraction step, the another document being a different version of the designated document; and
   performing control to, based on a result of the search performed in the search step, display document information of the designated document and document information of the another document in association with version information determined based on the signature information;
   wherein the searching the database includes searching for the another document whose signature information registered in the database includes a first signature that matches a first signature included in the signature information extracted by the extraction unit, and
   in each document, the first signature is a signature that was attached to the document first; and
   wherein
   in each document, the document information includes an editing history that is accumulated each time the document has been edited, and
   wherein, for each document to be newly registered in the database, a first signature is attached to the document to be newly registered, and, for each document in which an editing history is to be newly accumulated, another signature is attached to the document in correspondence with the newly accumulated editing history, the another signature enabling identification of which place in sequential order the another signature was attached.

7. A search apparatus including a database having registered therein signature information of a document and document information that includes location information indicating a storage location of the document, the document information and the signature information being registered in association with each other, the search apparatus comprising:
- a reception unit configured to receive a designated document that has been designated by a user;
- an extraction unit configured to extract signature information from the designated document received by the reception unit; and
- a search unit configured to search the database for another document having signature information that matches the signature information extracted by the extraction unit, the another document being a different version of the designated document;

wherein
the search unit searches for the another document whose signature information registered in the database includes a first signature that matches a first signature included in the signature information extracted by the extraction unit, and
in each document, the first signature is a signature that was attached to the document first;

wherein
in each document, the document information includes an editing history that is accumulated each time the document has been edited, and
for each document that is newly registered in the database, a first signature is attached to the document to be newly registered, and, for each document in which an editing history is to be newly accumulated, another signature is attached to the document in correspondence with the newly accumulated editing history, the another signature enabling identification of which place in sequential order the another signature was attached;

and
wherein the reception unit, the extraction unit and the search unit are implemented, at least in part, by hardware components of the search apparatus.

8. The search apparatus of claim 7, wherein
the search unit performs the search with use of a hash value based on the signature information.

9. A non-transitory computer-readable medium storing a search program that is executed by a computer including a database having registered therein signature information of a document and document information that includes location information indicating a storage location of the document, the document information and the signature information being registered in association with each other, the search program causing the computer to:
- receive a designated document that has been designated by a user;
- extract signature information from the received designated document; and
- search the database for another document having signature information that matches the extracted signature information, the another document being a different version of the designated document;

wherein the searching the database includes searching for the another document whose signature information registered in the database includes a first signature that matches a first signature included in the signature information extracted by the extraction unit, and
in each document, the first signature is a signature that was attached to the document first; and wherein
in each document, the document information includes an editing history that is accumulated each time the document has been edited, and
wherein, for each document to be newly registered in the database, a first signature is attached to the document to be newly registered, and, for each document in which an editing history is to be newly accumulated, another signature is attached to the document in correspondence with the newly accumulated editing history, the another signature enabling identification of which place in sequential order the another signature was attached.

* * * * *